US009831718B2

(12) United States Patent
Leabman et al.

(10) Patent No.: US 9,831,718 B2
(45) Date of Patent: *Nov. 28, 2017

(54) TV WITH INTEGRATED WIRELESS POWER TRANSMITTER

(71) Applicant: Energous Corporation, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/950,492

(22) Filed: Jul. 25, 2013

(65) Prior Publication Data

US 2015/0029397 A1 Jan. 29, 2015

(51) Int. Cl.
*H02J 7/00* (2006.01)
*H01F 21/02* (2006.01)
(Continued)

(52) U.S. Cl.
CPC ............. *H02J 17/00* (2013.01); *H02J 50/20* (2016.02); *H02J 50/23* (2016.02); *H04B 5/0037* (2013.01); *H04N 21/43637* (2013.01); *H01F 21/02* (2013.01); *H01Q 11/12* (2013.01); *H04B 1/04* (2013.01); *H04B 1/06* (2013.01); *H04N 5/30* (2013.01); *H04N 5/335* (2013.01); *H04N 5/63* (2013.01)

(58) Field of Classification Search
CPC .. H02J 7/00; H01F 21/02; H04N 5/30; H04N 5/335; H04N 5/63; H01Q 11/12; H04B 1/04; H04B 1/06

USPC .............. 320/108; 336/30; 348/162, 730; 455/127.1, 129, 343.1
See application file for complete search history.

(56) References Cited

U.S. PATENT DOCUMENTS 787,412 A    4/1905 Tesla
3,434,678 A  3/1969 Brown et al.
(Continued)

FOREIGN PATENT DOCUMENTS

CN    203826555 U    9/2014
CN    104090265 A    10/2014
(Continued)

OTHER PUBLICATIONS

International Search Report dated Nov. 13, 2014 corresponding to International Patent Application No. PCT/US2014/048002, 4 pages.
(Continued)

*Primary Examiner* — Phallaka Kik
(74) *Attorney, Agent, or Firm* — Morgan, Lewis & Bockius LLP

(57) ABSTRACT

Disclosed here is a TV system with an integrated wireless power transmitter. The wireless power transmitter enables the TV system to provide a power source in the form of pockets of energy. A wireless power receiver may be coupled to the electrical devices to receive an electrical power source and transfer it to the electrical device. The receivers in the devices may capture energy from the pockets of energy formed by the wireless transmitter component in the TV system in order to power an electrical device.

20 Claims, 4 Drawing Sheets

(51) Int. Cl.

| | | |
|---|---|---|
| H04N 5/30 | (2006.01) | |
| H04N 5/335 | (2011.01) | |
| H04N 5/63 | (2006.01) | |
| H01Q 11/12 | (2006.01) | |
| H04B 1/04 | (2006.01) | |
| H04B 1/06 | (2006.01) | |
| H02J 17/00 | (2006.01) | |
| H04N 21/4363 | (2011.01) | |
| H04B 5/00 | (2006.01) | |
| H02J 50/20 | (2016.01) | |
| H02J 50/23 | (2016.01) | |

(56) References Cited

U.S. PATENT DOCUMENTS

| | | |
|---|---|---|
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 * | 7/2003 | Tang .................. B60R 25/24 330/278 |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 | 10/2004 | Sabo |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,658 B2 | 7/2013 | Von Novak et al. |
| 8,552,597 B2 | 10/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |

(56) References Cited

U.S. PATENT DOCUMENTS

| | | |
|---|---|---|
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 * | 12/2016 | Hyde ................. H02J 17/00 |
| 9,522,270 B2 * | 12/2016 | Perryman ............ H02J 50/20 |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda et al. |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 * | 10/2003 | Sheppard et al. ............ 725/81 |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 * | 2/2005 | Wang ..................... 333/24 R |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0171411 A1 | 8/2005 | KenKnight |
| 2005/0198673 A1 * | 9/2005 | Kit et al. ..................... 725/68 |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0136004 A1 | 6/2006 | Cowan et al. |
| 2006/1195232 | 6/2006 | Yun et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman |
| 2006/0266917 A1 | 11/2006 | Baldis et al. |
| 2006/0278706 A1 | 12/2006 | Hatakeyama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 * | 7/2007 | Gallic ..................... 455/3.06 |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |

(56) References Cited

U.S. PATENT DOCUMENTS

| | | |
|---|---|---|
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1* | 2/2010 | Bennett ............... H02J 17/00 307/104 |
| 2010/0033390 A1 | 2/2010 | Alamouti et al. |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1* | 8/2010 | Burdo et al. ............... 307/104 |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby |
| 2010/0210233 A1 | 8/2010 | Cook et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto et al. |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |

(56) References Cited

U.S. PATENT DOCUMENTS

| | | |
|---|---|---|
| 2011/0304216 A1 | 12/2011 | Baarman |
| 2011/0304437 A1 | 12/2011 | Beeler |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer |
| 2012/0157019 A1 | 6/2012 | Li |
| 2012/0161531 A1* | 6/2012 | Kim .................... 307/104 |
| 2012/0161544 A1* | 6/2012 | Kashiwagi et al. ......... 307/104 |
| 2012/0169276 A1 | 7/2012 | Wang |
| 2012/0169278 A1 | 7/2012 | Choi |
| 2012/0173418 A1 | 7/2012 | Beardsmore et al. |
| 2012/0181973 A1 | 7/2012 | Lyden |
| 2012/0182427 A1 | 7/2012 | Marshall |
| 2012/0187851 A1 | 7/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1 | 12/2012 | Lu et al. |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057110 A1 | 3/2013 | Negaard et al. |
| 2013/0057205 A1 | 3/2013 | Lee et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Clayton |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1* | 10/2013 | Ben-Shalom et al. ......... 320/108 |
| 2013/0288600 A1 | 10/2013 | Kuusilinna et al. |
| 2013/0293423 A1 | 11/2013 | Moshfeghi |
| 2013/0310020 A1 | 11/2013 | Kazuhiro |

(56) References Cited

U.S. PATENT DOCUMENTS

| | | | |
|---|---|---|---|
| 2013/0311798 A1 | 11/2013 | Sultenfuss | |
| 2013/0328417 A1 | 12/2013 | Takeuchi | |
| 2013/0334883 A1 | 12/2013 | Kim et al. | |
| 2013/0339108 A1 | 12/2013 | Ryder et al. | |
| 2013/0343251 A1 | 12/2013 | Zhang | |
| 2014/0001846 A1 | 1/2014 | Mosebrook | |
| 2014/0001875 A1 | 1/2014 | Nahidipour | |
| 2014/0001876 A1 | 1/2014 | Fujiwara et al. | |
| 2014/0006017 A1 | 1/2014 | Sen | |
| 2014/0008992 A1* | 1/2014 | Leabman | H01F 38/14 307/104 |
| 2014/0008993 A1* | 1/2014 | Leabman | H02J 17/00 307/104 |
| 2014/0009108 A1* | 1/2014 | Leabman | H02J 17/00 320/107 |
| 2014/0009110 A1 | 1/2014 | Lee | |
| 2014/0011531 A1 | 1/2014 | Burstrom et al. | |
| 2014/0015336 A1 | 1/2014 | Weber et al. | |
| 2014/0015344 A1 | 1/2014 | Mohamadi | |
| 2014/0021907 A1 | 1/2014 | Yun et al. | |
| 2014/0021908 A1 | 1/2014 | McCool | |
| 2014/0035524 A1 | 2/2014 | Zeine | |
| 2014/0035526 A1 | 2/2014 | Tripathi et al. | |
| 2014/0049422 A1 | 2/2014 | Von Novak et al. | |
| 2014/0055098 A1 | 2/2014 | Lee et al. | |
| 2014/0057618 A1 | 2/2014 | Zirwas et al. | |
| 2014/0062395 A1 | 3/2014 | Kwon et al. | |
| 2014/0082435 A1 | 3/2014 | Kitgawa | |
| 2014/0086125 A1 | 3/2014 | Polo et al. | |
| 2014/0086592 A1 | 3/2014 | Nakahara et al. | |
| 2014/0091756 A1 | 4/2014 | Ofstein et al. | |
| 2014/0091968 A1 | 4/2014 | Harel et al. | |
| 2014/0111147 A1 | 4/2014 | Soar | |
| 2014/0113689 A1 | 4/2014 | Lee | |
| 2014/0117946 A1 | 5/2014 | Muller et al. | |
| 2014/0118140 A1 | 5/2014 | Amis | |
| 2014/0132210 A1 | 5/2014 | Partovi | |
| 2014/0133279 A1 | 5/2014 | Khuri-Yakub | |
| 2014/0139034 A1* | 5/2014 | Sankar et al. | 307/104 |
| 2014/0139039 A1 | 5/2014 | Cook et al. | |
| 2014/0139180 A1 | 5/2014 | Kim et al. | |
| 2014/0141838 A1 | 5/2014 | Cai et al. | |
| 2014/0142876 A1 | 5/2014 | John et al. | |
| 2014/0143933 A1 | 5/2014 | Low et al. | |
| 2014/0145879 A1 | 5/2014 | Pan | |
| 2014/0152117 A1 | 6/2014 | Sankar | |
| 2014/0159651 A1 | 6/2014 | Von Novak et al. | |
| 2014/0159652 A1 | 6/2014 | Hall et al. | |
| 2014/0159662 A1 | 6/2014 | Furui | |
| 2014/0159667 A1 | 6/2014 | Kim et al. | |
| 2014/0175893 A1 | 6/2014 | Sengupta et al. | |
| 2014/0176054 A1 | 6/2014 | Porat et al. | |
| 2014/0177399 A1 | 6/2014 | Teng et al. | |
| 2014/0184148 A1 | 7/2014 | Van Der Lee et al. | |
| 2014/0184155 A1 | 7/2014 | Cha | |
| 2014/0184163 A1 | 7/2014 | Das et al. | |
| 2014/0184170 A1 | 7/2014 | Jeong | |
| 2014/0191568 A1 | 7/2014 | Partovi | |
| 2014/0194092 A1 | 7/2014 | Wanstedt et al. | |
| 2014/0194095 A1 | 7/2014 | Wanstedt et al. | |
| 2014/0206384 A1 | 7/2014 | Kim et al. | |
| 2014/0210281 A1 | 7/2014 | Ito et al. | |
| 2014/0217967 A1 | 8/2014 | Zeine et al. | |
| 2014/0225805 A1 | 8/2014 | Pan et al. | |
| 2014/0232320 A1 | 8/2014 | Ento July et al. | |
| 2014/0239733 A1 | 8/2014 | Mach et al. | |
| 2014/0241231 A1 | 8/2014 | Zeine | |
| 2014/0245036 A1 | 8/2014 | Oishi | |
| 2014/0246416 A1 | 9/2014 | White | |
| 2014/0247152 A1 | 9/2014 | Proud | |
| 2014/0252813 A1 | 9/2014 | Lee et al. | |
| 2014/0252866 A1 | 9/2014 | Walsh et al. | |
| 2014/0265725 A1 | 9/2014 | Angle et al. | |
| 2014/0265727 A1 | 9/2014 | Berte | |
| 2014/0265943 A1 | 9/2014 | Angle et al. | |
| 2014/0266025 A1 | 9/2014 | Jakubowski | |
| 2014/0273892 A1 | 9/2014 | Nourbakhsh | |
| 2014/0281655 A1 | 9/2014 | Angle et al. | |
| 2014/0292090 A1 | 10/2014 | Cordeiro et al. | |
| 2014/0312706 A1 | 10/2014 | Fiorello et al. | |
| 2014/0325218 A1 | 10/2014 | Shimizu et al. | |
| 2014/0327320 A1 | 11/2014 | Muhs et al. | |
| 2014/0327390 A1 | 11/2014 | Park et al. | |
| 2014/0346860 A1 | 11/2014 | Aubry et al. | |
| 2014/0354063 A1 | 12/2014 | Leabman et al. | |
| 2014/0354221 A1* | 12/2014 | Leabman | H01F 38/14 320/108 |
| 2014/0355718 A1 | 12/2014 | Guan et al. | |
| 2014/0357309 A1 | 12/2014 | Leabman et al. | |
| 2014/0368048 A1* | 12/2014 | Leabman | H04B 5/0037 307/104 |
| 2014/0368161 A1* | 12/2014 | Leabman | H02J 7/025 320/108 |
| 2014/0375253 A1* | 12/2014 | Leabman | H02J 7/025 320/108 |
| 2014/0375255 A1* | 12/2014 | Leabman | H02J 7/025 320/108 |
| 2014/0375258 A1 | 12/2014 | Arkhipenkov | |
| 2014/0375261 A1 | 12/2014 | Manova-Elssibony et al. | |
| 2014/0376646 A1 | 12/2014 | Leabman et al. | |
| 2015/0001949 A1 | 1/2015 | Leabman et al. | |
| 2015/0002086 A1 | 1/2015 | Matos et al. | |
| 2015/0003207 A1 | 1/2015 | Lee et al. | |
| 2015/0008980 A1 | 1/2015 | Kim et al. | |
| 2015/0011160 A1 | 1/2015 | Jurgovan et al. | |
| 2015/0015180 A1 | 1/2015 | Miller et al. | |
| 2015/0015182 A1 | 1/2015 | Brandtman et al. | |
| 2015/0015192 A1* | 1/2015 | Leabman | H02J 7/025 320/108 |
| 2015/0015194 A1 | 1/2015 | Leabman et al. | |
| 2015/0015195 A1 | 1/2015 | Leabman et al. | |
| 2015/0021990 A1 | 1/2015 | Myer et al. | |
| 2015/0022008 A1 | 1/2015 | Leabman et al. | |
| 2015/0022009 A1 | 1/2015 | Leabman et al. | |
| 2015/0022010 A1* | 1/2015 | Leabman | H02J 17/00 307/104 |
| 2015/0023204 A1 | 1/2015 | Wil et al. | |
| 2015/0028688 A1 | 1/2015 | Masaoka | |
| 2015/0028694 A1* | 1/2015 | Leabman | H02J 17/00 307/149 |
| 2015/0028697 A1 | 1/2015 | Leabman et al. | |
| 2015/0029397 A1 | 1/2015 | Leabman et al. | |
| 2015/0035715 A1 | 2/2015 | Kim et al. | |
| 2015/0041459 A1 | 2/2015 | Leabman et al. | |
| 2015/0042264 A1* | 2/2015 | Leabman | H02J 17/00 320/108 |
| 2015/0042265 A1* | 2/2015 | Leabman | H04B 5/0037 320/108 |
| 2015/0044977 A1 | 2/2015 | Ramasamy et al. | |
| 2015/0046526 A1 | 2/2015 | Bush et al. | |
| 2015/0061404 A1 | 3/2015 | Lamenza et al. | |
| 2015/0076917 A1* | 3/2015 | Leabman | H02J 5/005 307/104 |
| 2015/0076927 A1* | 3/2015 | Leabman | H02J 17/00 307/151 |
| 2015/0077036 A1* | 3/2015 | Leabman | B60L 11/1811 320/101 |
| 2015/0077037 A1* | 3/2015 | Leabman | H02J 7/025 320/101 |
| 2015/0091520 A1 | 4/2015 | Blum et al. | |
| 2015/0097663 A1 | 4/2015 | Sloo et al. | |
| 2015/0102681 A1* | 4/2015 | Leabman | H01F 38/14 307/104 |
| 2015/0102764 A1* | 4/2015 | Leabman | H04B 5/0037 320/107 |
| 2015/0102769 A1* | 4/2015 | Leabman | H01F 38/14 320/108 |
| 2015/0108848 A1 | 4/2015 | Joehren | |
| 2015/0115877 A1 | 4/2015 | Arai et al. | |
| 2015/0115878 A1 | 4/2015 | Park | |
| 2015/0123483 A1* | 5/2015 | Leabman | H02J 7/025 307/104 |

(56) References Cited

U.S. PATENT DOCUMENTS

| | | | |
|---|---|---|---|
| 2015/0123496 A1* | 5/2015 | Leabman | H02J 17/00 307/151 |
| 2015/0128733 A1 | 5/2015 | Taylor et al. | |
| 2015/0130285 A1* | 5/2015 | Leabman | H02J 17/00 307/104 |
| 2015/0130293 A1 | 5/2015 | Hajimiri et al. | |
| 2015/0148664 A1 | 5/2015 | Stolka et al. | |
| 2015/0155737 A1 | 6/2015 | Mayo | |
| 2015/0155738 A1* | 6/2015 | Leabman | H02J 7/025 307/29 |
| 2015/0162751 A1* | 6/2015 | Leabman | A41B 1/08 219/211 |
| 2015/0162779 A1 | 6/2015 | Lee et al. | |
| 2015/0171656 A1* | 6/2015 | Leabman | H02J 7/025 320/108 |
| 2015/0171658 A1 | 6/2015 | Manova-Elssibony et al. | |
| 2015/0171931 A1 | 6/2015 | Won et al. | |
| 2015/0177326 A1 | 6/2015 | Chakraborty et al. | |
| 2015/0188352 A1 | 7/2015 | Peek et al. | |
| 2015/0199665 A1 | 7/2015 | Chu | |
| 2015/0207333 A1 | 7/2015 | Baarman et al. | |
| 2015/0207542 A1 | 7/2015 | Zeine | |
| 2015/0222126 A1* | 8/2015 | Leabman | H02J 7/0042 307/104 |
| 2015/0236520 A1 | 8/2015 | Baarman | |
| 2015/0244187 A1 | 8/2015 | Horie | |
| 2015/0244201 A1 | 8/2015 | Chu | |
| 2015/0244341 A1 | 8/2015 | Ritter et al. | |
| 2015/0249484 A1 | 9/2015 | Mach et al. | |
| 2015/0255989 A1 | 9/2015 | Walley et al. | |
| 2015/0263534 A1 | 9/2015 | Lee et al. | |
| 2015/0263548 A1 | 9/2015 | Cooper | |
| 2015/0270741 A1 | 9/2015 | Leabman et al. | |
| 2015/0280484 A1 | 10/2015 | Radziemski et al. | |
| 2015/0288438 A1 | 10/2015 | Maltsev et al. | |
| 2015/0318729 A1 | 11/2015 | Leabman | |
| 2015/0326024 A1* | 11/2015 | Bell | H02J 5/005 307/80 |
| 2015/0326025 A1 | 11/2015 | Bell et al. | |
| 2015/0326063 A1 | 11/2015 | Leabman et al. | |
| 2015/0326068 A1* | 11/2015 | Bell | H02J 17/00 307/149 |
| 2015/0326069 A1 | 11/2015 | Petras et al. | |
| 2015/0326070 A1 | 11/2015 | Petras et al. | |
| 2015/0326072 A1 | 11/2015 | Petras et al. | |
| 2015/0326142 A1 | 11/2015 | Petras et al. | |
| 2015/0326143 A1 | 11/2015 | Petras et al. | |
| 2015/0333528 A1 | 11/2015 | Leabman | |
| 2015/0333529 A1 | 11/2015 | Leabman | |
| 2015/0333573 A1 | 11/2015 | Leabman | |
| 2015/0333800 A1 | 11/2015 | Perry et al. | |
| 2015/0340759 A1 | 11/2015 | Bridgelall et al. | |
| 2015/0340903 A1* | 11/2015 | Bell | H02J 7/025 307/104 |
| 2015/0340909 A1* | 11/2015 | Bell | H02J 17/00 307/104 |
| 2015/0340910 A1 | 11/2015 | Petras et al. | |
| 2015/0340911 A1 | 11/2015 | Bell et al. | |
| 2015/0341087 A1 | 11/2015 | Moore et al. | |
| 2015/0349574 A1 | 12/2015 | Leabman | |
| 2015/0358222 A1 | 12/2015 | Berger et al. | |
| 2015/0365138 A1 | 12/2015 | Miller et al. | |
| 2016/0005068 A1 | 1/2016 | Im et al. | |
| 2016/0012695 A1 | 1/2016 | Bell et al. | |
| 2016/0013656 A1 | 1/2016 | Bell et al. | |
| 2016/0013677 A1 | 1/2016 | Bell et al. | |
| 2016/0013678 A1 | 1/2016 | Bell et al. | |
| 2016/0013855 A1 | 1/2016 | Campos | |
| 2016/0020636 A1 | 1/2016 | Khlat | |
| 2016/0020649 A1 | 1/2016 | Bell et al. | |
| 2016/0020830 A1 | 1/2016 | Bell et al. | |
| 2016/0042206 A1 | 2/2016 | Pesavento et al. | |
| 2016/0054395 A1 | 2/2016 | Bell et al. | |
| 2016/0054396 A1 | 2/2016 | Bell et al. | |
| 2016/0054440 A1 | 2/2016 | Younis | |
| 2016/0056635 A1 | 2/2016 | Bell | |
| 2016/0056640 A1 | 2/2016 | Mao | |
| 2016/0056669 A1 | 2/2016 | Bell | |
| 2016/0056966 A1 | 2/2016 | Bell | |
| 2016/0065005 A1 | 3/2016 | Won et al. | |
| 2016/0079799 A1 | 3/2016 | Khlat | |
| 2016/0094092 A1 | 3/2016 | Davlantes et al. | |
| 2016/0099601 A1 | 4/2016 | Leabman et al. | |
| 2016/0099602 A1 | 4/2016 | Leabman et al. | |
| 2016/0099609 A1 | 4/2016 | Leabman et al. | |
| 2016/0099610 A1 | 4/2016 | Leabman et al. | |
| 2016/0099611 A1 | 4/2016 | Leabman et al. | |
| 2016/0099612 A1 | 4/2016 | Leabman et al. | |
| 2016/0099613 A1 | 4/2016 | Leabman et al. | |
| 2016/0099614 A1 | 4/2016 | Leabman et al. | |
| 2016/0099755 A1 | 4/2016 | Leabman et al. | |
| 2016/0099756 A1 | 4/2016 | Leabman et al. | |
| 2016/0099757 A1 | 4/2016 | Leabman et al. | |
| 2016/0099758 A1 | 4/2016 | Leabman et al. | |
| 2016/0100124 A1* | 4/2016 | Leabman | H04N 5/63 348/730 |
| 2016/0100312 A1 | 4/2016 | Bell et al. | |
| 2016/0126752 A1 | 5/2016 | Vuori et al. | |
| 2016/0126776 A1 | 5/2016 | Kim et al. | |
| 2016/0141908 A1 | 5/2016 | Jakl et al. | |
| 2016/0164563 A1 | 6/2016 | Khawand et al. | |
| 2016/0181854 A1 | 6/2016 | Leabman | |
| 2016/0181867 A1 | 6/2016 | Daniel et al. | |
| 2016/0181873 A1 | 6/2016 | Mitcheson et al. | |
| 2016/0191121 A1* | 6/2016 | Bell | H02J 5/005 307/104 |
| 2016/0204622 A1 | 7/2016 | Leabman | |
| 2016/0204642 A1 | 7/2016 | Oh | |
| 2016/0238365 A1 | 8/2016 | Wixey et al. | |
| 2016/0299210 A1 | 10/2016 | Zeine | |
| 2016/0323000 A1 | 11/2016 | Liu et al. | |
| 2016/0336804 A1 | 11/2016 | Son et al. | |
| 2016/0339258 A1* | 11/2016 | Perryman | A61N 1/37252 |
| 2016/0359367 A1* | 12/2016 | Rothschild | H02J 7/025 |
| 2017/0005516 A9 | 1/2017 | Leabman et al. | |
| 2017/0005530 A1 | 1/2017 | Zeine et al. | |
| 2017/0025903 A1 | 1/2017 | Song et al. | |
| 2017/0026087 A1 | 1/2017 | Tanabe | |
| 2017/0043675 A1 | 2/2017 | Jones et al. | |
| 2017/0047784 A1 | 2/2017 | Jung et al. | |
| 2017/0077735 A1 | 3/2017 | Leabman | |
| 2017/0077736 A1 | 3/2017 | Leabman | |
| 2017/0077764 A1 | 3/2017 | Bell et al. | |
| 2017/0077765 A1 | 3/2017 | Bell et al. | |
| 2017/0077995 A1 | 3/2017 | Leabman | |
| 2017/0085120 A1* | 3/2017 | Leabman | H02J 7/042 |
| 2017/0085437 A1 | 3/2017 | Condeixa et al. | |
| 2017/0092115 A1 | 3/2017 | Sloo et al. | |
| 2017/0110887 A1 | 4/2017 | Bell et al. | |
| 2017/0134686 A9 | 5/2017 | Leabman | |
| 2017/0163076 A1 | 6/2017 | Park et al. | |
| 2017/0179763 A9 | 6/2017 | Leabman | |

FOREIGN PATENT DOCUMENTS

| | | | |
|---|---|---|---|
| EP | 1028482 A2 | 8/2000 | |
| EP | 1081506 A1 | 3/2001 | |
| EP | 2397973 A1 | 6/2010 | |
| EP | 2346136 A1 | 7/2011 | |
| EP | 2545635 A2 | 1/2013 | |
| JP | 2006157586 A | 6/2006 | |
| JP | 2007043432 A | 2/2007 | |
| JP | 2008167017 A * | 7/2008 | H03F 3/24 |
| KR | 20060061776 A | 6/2006 | |
| KR | 10-2007-0044302 A | 4/2007 | |
| KR | 100755144 B1 | 9/2007 | |
| KR | 10-2011-1032059 A | 12/2011 | |
| KR | 20110132059 A | 12/2011 | |
| KR | 20110135540 A1 | 12/2011 | |
| KR | 10-2012-0009843 A | 2/2012 | |
| KR | 20120108759 A | 10/2012 | |
| KR | 1020130026977 A | 3/2013 | |
| WO | 9952173 A2 | 10/1999 | |

(56) References Cited

FOREIGN PATENT DOCUMENTS

| WO | WO 200111716 A1 | 2/2001 | |
|---|---|---|---|
| WO | 03091943 A1 | 11/2003 | |
| WO | 2004077550 A1 | 9/2004 | |
| WO | WO 2006122783 | 11/2006 | |
| WO | 2008156571 A2 | 12/2008 | |
| WO | WO2010022181 A1 | 2/2010 | |
| WO | WO 2010022181 A1 * | 2/2010 | .............. H01Q 1/24 |
| WO | WO 2010039246 A1 | 4/2010 | |
| WO | 2010138994 A1 | 12/2010 | |
| WO | 2011112022 A2 | 9/2011 | |
| WO | WO 2012177283 A1 | 12/2012 | |
| WO | 2013 042399 A1 | 3/2013 | |
| WO | 2013035190 A1 | 3/2013 | |
| WO | 2013042399 A1 | 3/2013 | |
| WO | WO 2013031988 A1 | 3/2013 | |
| WO | WO 2013038074 A2 | 3/2013 | |
| WO | WO 2013052950 A1 | 4/2013 | |
| WO | WO 2013105920 A2 | 7/2013 | |
| WO | WO 2014075103 A1 | 5/2014 | |
| WO | WO 2014132258 A1 | 9/2014 | |
| WO | WO 2014182788 A2 | 11/2014 | |
| WO | WO 2014182788 A3 | 11/2014 | |
| WO | WO 2014197472 A1 | 12/2014 | |
| WO | WO 2014209587 A1 | 12/2014 | |
| WO | WO 2015038773 A1 | 3/2015 | |
| WO | WO 2015097809 A1 | 7/2015 | |
| WO | WO 2015161323 A1 | 10/2015 | |
| WO | WO 2016048512 A1 | 3/2016 | |
| WO | WO 2016187357 A1 | 11/2016 | |

OTHER PUBLICATIONS

Written Opinion of the International Searching Authority dated Nov. 13, 2014 corresponding to International Patent Application No. PCT/US2014/048002, 7 pages.
International Search Report dated Sep. 12, 2014 corresponding to International Patent Application No. PCT/US2014/037072, 3 pages.
International Search Report dated Jan. 27, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Witten Opinion of the International Searching Authority dated Nov. 12, 2014 corresponding to International Patent Application No. PCT/US2014/046956, 6 pages.
United States Non-Final Office Action issued in U.S. Appl. No. 14/173,936 dated Feb. 25, 2016.
United States Notice of Allowance issued in U.S. Appl. No. 14/104,503 dated Oct. 5, 2015.
United States Non-Final Office Action issued in U.S. Appl. No. 14/103,528 dated Feb. 12, 2016.
United States Non-Final Office Action issued in U.S. Appl. No. 14/095,358 dated Feb. 3, 2016.
United States Non-Final Office Action issued in U.S. Appl. No. 14/075,376 dated Jul. 14, 2015.
United States Non-Final Office Action issued in U.S. Appl. No. 14/069,983 dated Feb. 3, 2016.
United States Non-Final Office Action issued in U.S. Appl. No. 14/069,934 dated Feb. 16, 2016.
United States Non-Final Office Action issued in U.S. Appl. No. 14/051,170 dates Apr. 10, 2015.
United States Non-Final Office Action issued in U.S. Appl. No. 14/051,128 dates Mar. 4, 2015.
United States Non-Final Office Action issued in U.S. Appl. No. 14/026,852 dated Feb. 2, 2016.
United States Non-Final Office Action issued in U.S. Appl. No. 14/026,747 dated Aug. 4, 2015.
United States Non-Final Office Action issued in U.S. Appl. No. 13/960,522 dated May 15, 2015.
United States Non-Final Office Action issued in U.S. Appl. No. 13/950,536 dated Jan. 11, 2016.
United States Non-Final Action issued in U.S. Appl. No. 13/946,128 dated Feb. 26, 2016.
United States Non-Final Office Action issued in U.S. Appl. No. 13/939,506 dated Mar. 11, 2015.
United States Notice of Allowance issued in U.S. Appl. No. 13/926,020 dated May 15, 2015.
United States Non-Final Office Action issued in U.S. Appl. No. 13/926,020 dated Mar. 19, 2015.
United States Final Office Action issued in U.S. Appl. No. 13/919,567 dated Aug. 27, 2015.
United States Non-Final Office Action issued in U.S. Appl. No. 13/919,567 dated Jan. 16, 2015.
United States Non-Final Office Action issued in U.S. Appl. No. 13/916,233 dated Nov. 16, 2015.
United States Non-Final Office Action issued in U.S. Appl. No. 13/908,839 dated Jun. 29, 2015.
Notification of Transmittal of The International Search Report and The Written Opinion of the International Searching Authority, or The Declaration issued in International Application No. PCT/USI5/67242 with Date of mailing Mar. 16, 2016.
United States Non-Final Office Action issued in U.S. Appl. No. 13/908,399 dated Nov. 17, 2014.
United States Final Office Action issued in U.S. Appl. No. 13/925,469 dated May 31, 2016.
United States Final Office Action issued in U.S. Appl. No. 13/925,469 dated Dec. 2, 2016.
United States Non-Final Office Action issued in U.S. Appl. No. 14/584,618 dated Apr. 22, 2016.
International Search Report issued in International Application No. PCT/US2014/062682 with Date of mailing Feb. 12, 2015, 7 pages.
International Search Report issued in International Patent Application No. PCT/US2014/037170 with Date of mailing Sep. 15, 2014, 4 pages.
International Search Report issued in International Patent Application No. PCT/US2014/041323 with Date of mailing Oct. 1, 2014, 3 pages.
Written Opinion of the International Searching Authority issued in International Patent Application No. PCT/US2014/041323 with Date of mailing Oct. 1, 2014, 7 pages.
International Search Report issued in International Patent Application No. PCT/US2014/059317 with Date of mailing Feb. 24, 2015, 4 pages.
International Search Report issued in International Patent Application No. PCT/US2014/054897 with Date of mailing Feb. 17, 2015, 10 pages.
International Search Report issued in International Patent Application No. PCT/US2012/049669 with Date of mailing Oct. 26, 2012, 3 pages.
Written Opinion of the International Searching Authority issued in International Patent Application No. PCT/US2012/049669 with Date of mailing Oct. 26, 2012, 6 pages.
International Search Report issued in International Patent Application No. PCT/US2014/049666 with Date of mailing Nov. 10, 2014, 3 pages.
Witten Opinion of the International Searching Authority issued in International Patent Application No. PCT/US2014/049666 with Date of mailing Nov. 10, 2014, 4 pages.
International Search Report issued in International Patent Application No. PCT/US2014/046961 with Date of mailing Nov. 24, 2014, 9 pages.
Written Opinion of the International Searching Authority issued in International Patent Application No. PCT/US2014/0046961 with Date of mailing Nov. 24, 2014, 7 pages.
Energous Corp., Written Opinion, PCT/US2014/037170, Sep. 15, 2014, 7 pgs.
Energous Corp., IPRP, PCT/US2014/037170, Nov. 10, 2015, 8 pgs.
Energous Corp., Written Opinion, PCT/US2014/041534, Oct. 13, 2014, 6 pgs.
Energous Corp., IPRP, PCT/US2014/041534, Dec. 29, 2015, 7 pgs.

(56) References Cited

OTHER PUBLICATIONS

Energous Corp., Written Opinion, PCT/US2014/037072, Sep. 12, 2014, 5 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/67287, Feb. 2, 2016, 9 pgs.
Energous Corp., ISRWO, PCT/US2015/67291, Mar. 4, 2016, 10 pgs.
Energous Corp., ISRWO, PCT/US2015/67242, Mar. 16, 2016, 9 pgs.
Energous Corp., ISRWO, PCT/US2015/67243, Mar. 10, 2016, 11 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/67275, Mar. 3, 2016, 8 pgs.
Energous Corp., ISRWO, PCT/US2015/067245, Mar. 17, 2016, 13 pgs.
Energous Corp., ISRWO, PCT/US2014/041546, Oct. 16, 2014, 12 pgs.
Energous Corp., ISRWO, PCT/US2015/67250, Mar. 30, 2016, 11 pgs.
Energous Corp., ISRWO, PCT/US2015/067325, Mar. 10, 2016, 9 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., ISRWO, PCT/US2015/067246, May 11, 2016, 12 pgs.
Energous Corp., IPRP, PCT/US2014/059317, Feb. 24, 2015, 10 pgs.
Energous Corp., IPRP, PCT/US2014/049669, Feb. 9, 2016, 8 pgs.
Energous Corp., IPRP, PCT/US2014/041323, Dec. 22, 2015, 8 pgs.
Energous Corp., IPRP, PCT/US2014/048002, Nov. 13, 2014, 8 pgs.
Energous Corp., IPRP, PCT/US2014/062682, Feb. 12, 2015, 8 pgs.
Energous Corp., ISRWO, PCT/US2014/049666, Nov. 10, 2014, 7pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Supplementary European Search Report, EP Patent Application No. EP14818136-5, Jul. 21, 2016, 9 pgs.
Energous Corp., IPRP, PCT/US2014/046956, Jan. 19, 2016, 7 pgs.
Energous Corp., IPRP, PCT/US2015/067291, Jul. 4, 2017, 4 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067275, Jul. 4, 2017, 7 pgs.
Energous Corp., IPRP, PCT/US2015/067245, Jun. 27, 2017, 7 pgs.
Energous Corp., IPRP, PCT/US2014/041546, Dec. 29, 2015, 9 pgs.
Energous Corp., IPRP, PCT/US2015/67250, Mar. 30, 2016, 10 pgs.
Energous Corp., IPRP, PCT/US2015/067325, Jul. 4, 2017, 8 pgs.
Energous Corp., IPRP, PCT/US2015/067249, Jun. 27, 2017, 7 pgs.
Energous Corp., IPRP, PCT/US2015/067246, Jun. 27, 2017, 9 pgs.
Energous Corp., IPRP, PCT/US2015/067279, Jul. 4, 2017, 7 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP, PCT/US2014/045237, Jan. 12, 2016, 12 pgs.
Energous Corp., ISRWO, PCT/US2014/054897, Feb. 17, 2015, 10 pgs.
Energous Corp., IPRP, PCT/US2014/054897, Mar. 15, 2016, 8 pgs.
Energous Corp., ISRWO, PCT/US2015/067334, Mar. 3, 2016, 6 pgs.
Energous Corp., IPRP, PCT/US2015/067334, Jul. 4, 2017, 5 pgs.
Energous Corp., ISRWO, PCT/US2014/047963, Nov. 7, 2014, 13 pgs.
Energous Corp., IPRP, PCT/US2014/047963, Jan. 26, 2016, 10 pgs.
Energous Corp., ISRWO, PCT/US2014/054891, Dec. 18, 2014, 12 pgs.
Energous Corp., IPRP, PCT/US2014/054891, Mar. 15, 2016, 10 pgs.
Energous Corp., ISRWO, PCT/US2014/054953, Dec. 4, 2014, 7 pgs.
Energous Corp., IPRP, PCT/US2014/054953, Mar. 22, 2016, 5 pgs.
Energous Corp., ISRWO, PCT/US2015/067294, Mar. 29, 2016, 7 pgs.
Energous Corp., IPRP, PCT/US2015/067294, Jul. 4, 2017, 6 pgs.
Energous Corp., ISRWO, PCT/US2014/062672 Jan. 26, 2015, 11 pgs.
Energous Corp., IPRP, PCT/US2014/062672 May 10, 2016, 8 pgs.
Energous Corp., ISRWO, PCT/US2014/044810 Oct. 21, 2014, 12 pgs.
Energous Corp., IPRP, PCT/US2014/044810, Jan. 5, 2016, 10 pgs.
Energous Corp., ISRWO, PCT/US2015/067271, Mar. 11, 2016, 6 pgs.
Energous Corp., IPRP, PCT/US2015/067271, Jul. 4, 2017, 5 pgs.
Energous Corp., ISRWO, PCT/US2014/040648, Oct. 10, 2014, 11 pgs.
Energous Corp., IPRP, PCT/US2014/040648, Dec. 8, 2015, 8 pgs.
Energous Corp., ISRWO, PCT/US2014/049673, Nov. 18, 2014, 10 pgs.
Energous Corp., IPRP, PCT/US2014/049673, Feb. 9, 2016, 6 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.

(56) References Cited

OTHER PUBLICATIONS

Energous Corp., ISRWO, PCT/US2016/068993, Mar. 13, 2017, 12 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/069316 , Mar. 16, 2017, 15 pgs.
European Search Report, EP Patent Application No. EP16189052.0, Jan. 31, 2017, 11 pgs.
European Search Report, EP Patent Application No. EP16189319-3, Feb. 1, 2017, 9 pgs.
European Search Report, EP Patent Application No. EP14822971, Feb. 1, 2017, 9 pgs.
European Search Report, EP Patent Application No. EP16189987, Feb. 1, 2017, 8 pgs.
European Search Report, EP Patent Application No. 16196205.5, Mar. 28, 2017.
European Search Report, EP Patent Application No. 16189300, Feb. 28, 2017, 4 pgs.
European Search Report, EP Patent Application No. 16189988.5, Mar. 1, 2017, 4 pgs.
European Search Report, EP Patent Application No. 16189982.5, Jan. 27, 2017, 9 pgs.
European Search Report, EP Patent Application No. 16189974, Mar. 2, 2017, 5 pgs.
European Search Report, EP Patent Application No. 16193743, Feb. 2, 2017, 5 pgs.
European Search Report, EP Patent Application No. 14868901.1, Jul. 7, 2017, 5 pgs.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

\* cited by examiner

TV WITH INTEGRATED WIRELESS POWER TRANSMITTER

CROSS-REFERENCES TO RELATED APPLICATIONS

The present disclosure is related to U.S. Non-Provisional patent application Ser. No. 13/891,340 filed May 10, 2013, entitled Methodology for Pocket-Forming; Ser. No. 13/925,469 filed Jun. 24, 2013, entitled Methodology for Multiple Pocket-Forming; Ser. No. 13/946,082 filed Jul. 19, 2013, entitled Method for 3 Dimensional Pocket-Forming; Ser. No. 13/891,399, filed May 10, 2013, entitled Receivers for Wireless Power Transmission and Ser. No. 13/891,445, filed May 10, 2013, entitled Transmitters for Wireless Power Transmission, the entire content of which are incorporated herein by these references.

FIELD OF INVENTION

The present disclosure relates to a television (TV) system, and more particularly, a TV system having a wireless power transmission function.

BACKGROUND OF THE INVENTION

TV systems have become the center for entertainment in most households today. Families, friends and people in general gather around a TV either to watch news, TV shows, play games, listen to music or just for searching entertainment. At times the use of other devices, such as laptop computers, gaming systems, mobile phones or any devices that may require electrical power source may be used near a TV. The use of electrical power sockets may be limited or impractical in some situations, additional cables may be required and this may become tedious or uncomfortable. Thus, a need exists for an electrical power source that addresses these issues near a TV.

SUMMARY OF THE INVENTION

Disclosed here is a TV system which may transmit wireless electrical power to other devices within range. The TV system includes a transmitter component which may transmit electrical power through pocket-forming. The transmitter component may be integrated as an individual component within the TV or integrated on existing components of a TV. Receiver devices may be adapted to any electrical devices that may require electrical input.

Numerous other aspects, features and benefits of the present disclosure may be made apparent from the following detailed description taken together with the drawing figures.

A method for wireless power transmission in a television system, comprising the steps of emitting power RF waves from a transmitter integrated with the television system to generate pockets of energy through pocket-forming, coupling receivers to an electronic device, capturing the pockets of energy at the receivers, and powering or charging the electronic device from the captured pockets of energy.

A wireless power transmission for a television system, comprising a pocket-forming transmitter integrated into the television system for emitting power RF waves to form pockets of energy that converge in 3-d space, and a receiver connected to an electronic device for capturing the pockets of energy to charge or power the device.

BRIEF DESCRIPTION OF THE DRAWINGS

Embodiments of the present disclosure are described by way of example with reference to the accompanying figures, which are schematic and are not intended to be drawn to scale. Unless indicated as representing prior art, the figures represent aspects of the present disclosure.

DETAILED DESCRIPTION OF THE DRAWINGS

Figure 1:
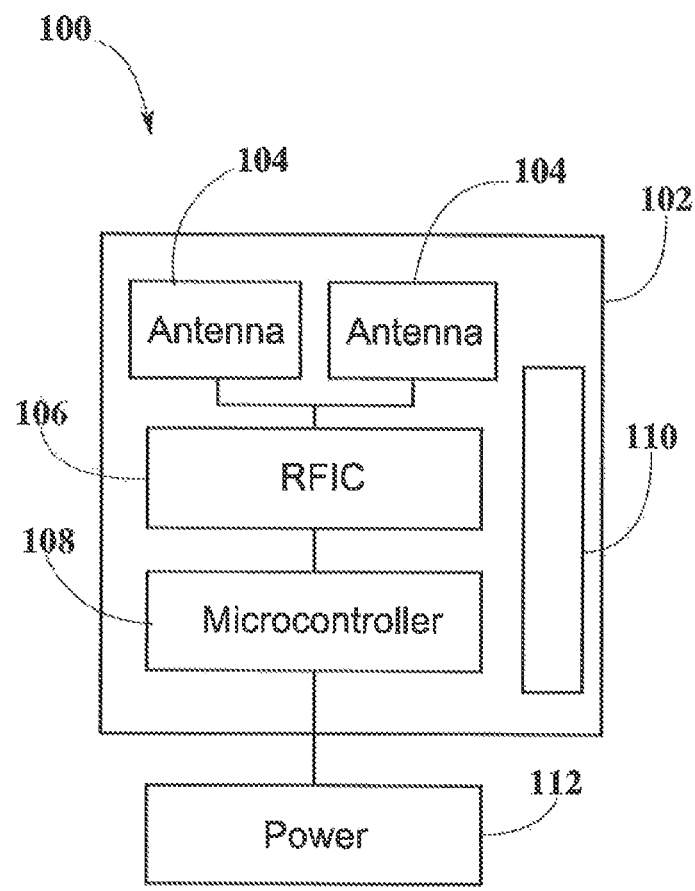
FIG. 1 illustrates a component level embodiment for a transmitter, according to an embodiment.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RF signals are directed to a target.

"Receiver" may refer to a device which may include at least one antenna, at least one rectifying circuit and at least one power converter for powering or charging an electronic device using RF waves.

"Adaptive pocket-forming" may refer to dynamically adjusting pocket forming to regulate power on one or more targeted receivers.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

FIG. 1 illustrates a component level embodiment for a transmitter 100 which may provide wireless power transmission. Transmitter 100 may include a housing 102 where at least two or more antenna elements 104, at least one RF integrated circuit (RFIC 106) 106, at least one digital signal processor (DSP) or micro-controller 108, and one optional communications component 110 may be included. Housing 102 can be made of any suitable material which may allow for signal or wave transmission and/or reception, for example plastic or hard rubber. Antenna elements 104 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 104 may include vertical or horizontal polarization, right hand or left hand polarization, elliptical polarization, or other suitable polarizations as well as suitable polarization combinations. Suitable antenna types may include, for example, patch antennas with heights from about ⅛ inches to about 6 inch and widths from about ⅛ inches to about 6 inch. Other antenna elements 104 types can be used, for example meta-materials, dipole antennas among others. RFIC 106 may include a proprietary chip for adjusting phases and/or relative magnitudes of RF signals which may serve as inputs for antenna elements 104 for controlling pocket-forming. These RF signals may be produced using an external power supply 112 and a local oscillator chip (not shown) using a suitable piezoelectric material. Micro-controller 108 may then process information send by a receiver through its own antenna elements for determining optimum times and locations for pocket-forming. In some embodiments, the foregoing may be achieved through communications component 110. Communications component 110 may be based on standard wireless communication protocols which may include Bluetooth, Wi-Fi or ZigBee. In addition, communications component 110 may be used to transfer other information such as an identifier for the device or user, battery level, location or other such information. Other communications component 110 may be possible which may include radar, infrared cameras or sound devices for sonic triangulation for determining the device's position.

Figure 2:
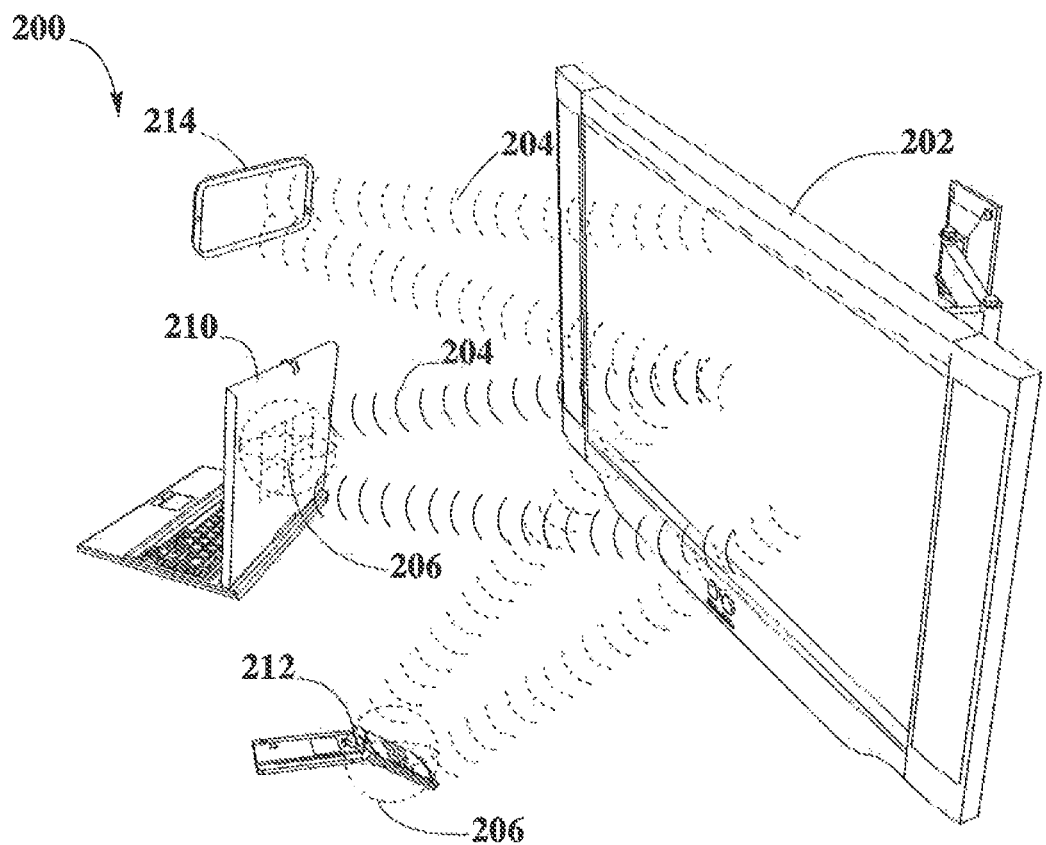
FIG. 2 illustrates wireless power transmission using pocket-forming, according to an embodiment.

FIG. 2 illustrates TV set 202 that provides wireless power transmission 200 using pocket-forming. A TV set 202 may transmit controlled Radio Frequency (RF) waves 204 which may converge in 3-d space. These RF waves may be controlled through phase and/or relative amplitude adjustments to form constructive and destructive interference patterns (pocket-forming). Pockets of energy 206 may form at constructive interference patterns and can be 3-dimensional in shape whereas null-spaces may be generated at destructive interference patterns. A receiver 400 may then utilize pockets of energy 206 produced by pocket-forming for charging or powering an electronic device, for example a laptop computer 210, Mobile phone 212, tablets 214 and any electrical devices within reach and thus effectively providing wireless power transmission 200. In other embodiments, adaptive pocket-forming may be used to regulate power on electronic devices.

Figure 3:
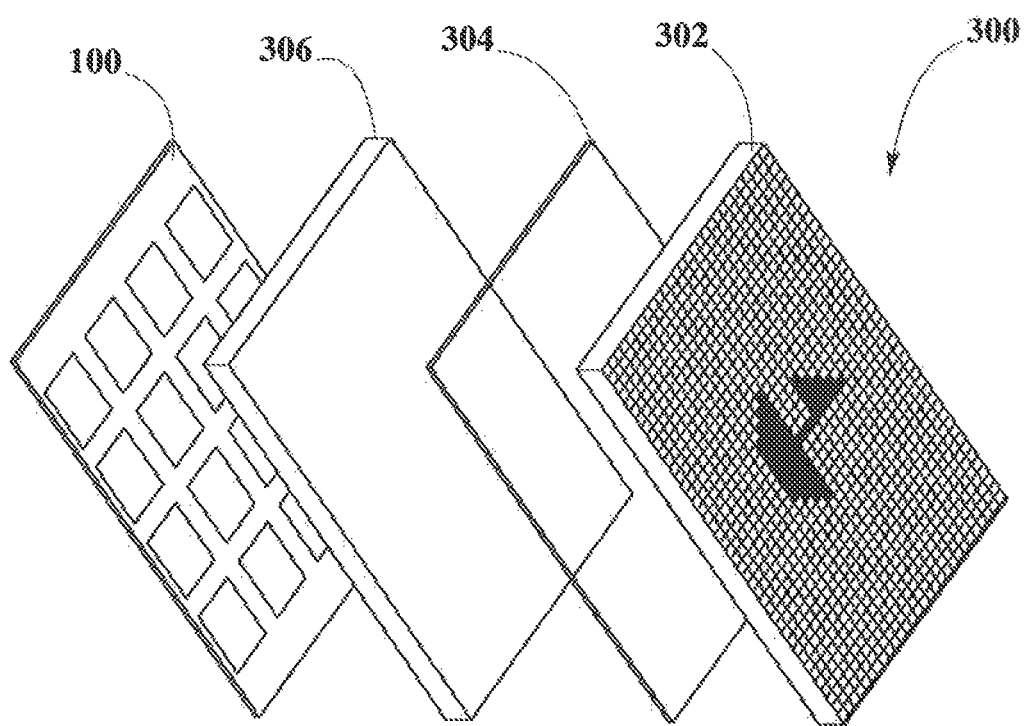
FIG. 3 illustrates an internal layer structure for a TV screen with an integrated transmitter, according to an embodiment.

FIG. 3 illustrates an exemplary embodiment of a break down view 300 of a TV set 202 with an integrated transmitter 100. A TV set 202 may include a plurality of components. In an embodiment, a TV set 202 may include a front transparent screen layer 302, a polarized film layer 304, and an LED/LCD backlight layer 306. A TV set 202 may additionally include a transmitter 100. In another embodiment, transmitter 100 may be integrated within the layers instead of as a separate layer.

In other embodiments, most of the circuitry of transmitter 100 can be placed inside TV set 202, with antenna elements 104 placed around the edges of TV set 202. In other embodiments, antenna elements 104 can be placed on the outside surface of the back of TV set 202. In yet further embodiments, antenna elements 104 can be printed micro-antennas which can be built-in on TV set 202 screen. Such printed-antennas can be produced with well-known in the art photolithographic or screen printing techniques. Such antennas can be beneficial because they can be printed at tinny scales which render them invisible to the human eye.

Figure 4:
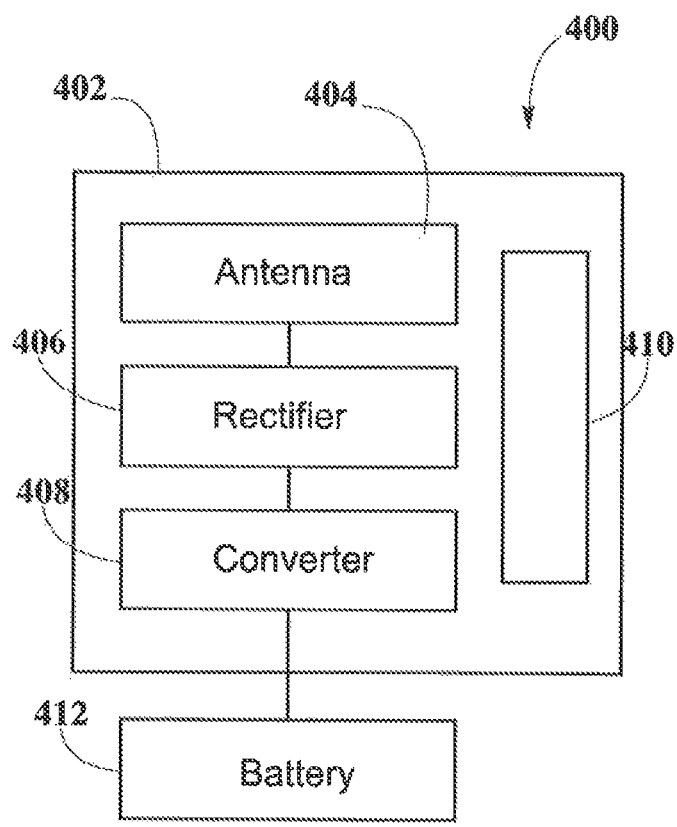
FIG. 4 illustrates a component level embodiment for a receiver, according to an embodiment.

FIG. 4 illustrates a component level embodiment for a receiver 400 which can be used for powering or charging an electronic device as exemplified in wireless power transmission 200. Receiver 400 may include a Housing 402 where at least one antenna element 404, one rectifier 406, one power converter 408 and an optional communications component 410 may be included. Housing 402 can be made of any suitable material which may allow for signal or wave transmission and/or reception, for example plastic or hard rubber. Housing 402 may be an external hardware that may be added to different electronic equipment, for example in the form of cases, or can be embedded within electronic equipment as well. Antenna element 404 may include suitable antenna types for operating in frequency bands similar to the bands described for transmitter 100 from FIG. 1. Antenna element 404 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas which may dictate a ratio for the number of antennas of a given polarization. Suitable antenna types may include patch antennas with heights from about ⅛ inches to about 6 inch and widths from about ⅛ inches to about 6 inch. Patch antennas may have the advantage that polarization may depend on connectivity, i.e. depending on which side the patch is fed, the polarization may change. This may further prove advantageous as a receiver, such as receiver 400, may dynamically modify its antenna polarization to optimize wireless power transmission 200. Rectifier 406 may include diodes or resistors, inductors or capacitors to rectify the alternating current (AC) voltage generated by antenna element 404 to direct current (DC) voltage. Rectifier 406 may be placed as close as is technically possible to antenna element 404 to minimize losses. After rectifying AC voltage, DC voltage may be regulated using power converter 408. Power converter 408 can be a DC-DC converter which may help provide a constant voltage output, regardless of input, to an electronic device, or as in this embodiment to a battery 412. Typical voltage outputs can be from about 5 volts to about 10 volts. Lastly, communications component 410, similar to that of transmitter 100 from FIG. 1, may be included in receiver 400 to communicate with a transmitter 100 or to other electronic equipment.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

Having thus described the invention, we claim:

1. A method for wireless power transmission in a television system, comprising the steps of:

transmitting, by a first set of antennas of at least two RF antennas of a transmitter coupled to the television system, power RF waves that converge to form controlled constructive interference at a location of a receiver coupled to an electronic device, wherein the receiver is configured to capture RF energy from the controlled constructive interference and to power or charge the electronic device, and wherein the transmitter with the at least two RF antennas is an individual component or an integrated layer of the television system;

transmitting, by a second set of antennas of the at least two RF antennas of the transmitter, additional power RF waves that converge to form controlled destructive interference, the second set of antennas being distinct from the first set of antennas;

receiving, by a communication component of the transmitter, communications from the receiver, wherein the communications from the receiver comprise a communication signal indicating a location of the receiver relative to the transmitter, and wherein the transmitter is configured to transmit the power RF waves that converge at the location of the receiver based upon the communications from the receiver; and rectifying, by a rectifier coupled to the receiver, AC voltage received from the at least two RF antennas into DC voltage for charging the electronic device.

2. The method for wireless power transmission in a television system of claim 1, wherein the communication component of the transmitter is configured to send RF signals between the transmitter and the receiver to establish a path or channel for the power RF waves that converge at the location of the receiver, and wherein antennas of the receiver are configured to capture the RF energy from the constructive interference patterns.

3. The method for wireless power transmission in a television system of claim 1, wherein the television system includes a front transparent screen layer, a polarized film layer, an LED or LCD backlight layer, and wherein the transmitter with the at least two RF antennas is included in a separate layer attached to one of the other layers in the television system.

4. The method for wireless power transmission in a television system of claim 1, wherein the at least two RF antennas of the transmitter comprise antenna elements mounted around edges of the television system, antenna elements mounted on the back of the television system, or antenna elements on printed micro-antennas built-in the television system.

5. The method for wireless power transmission in a television system of claim 4, wherein the printed micro-antennas are produced by photolithographic or screen printing techniques.

6. The method for wireless power transmission in a television system of claim 4, further comprising operating the receiver in a frequency band of the transmitter wherein antenna elements of the receiver and the at least two RF antennas of the transmitter include vertical or horizontal polarization, right hand or left hand polarization, elliptical polarization or any combination thereof.

7. The method for wireless power transmission in a television system of claim 1, further including adjusting one or more characteristics used to transmit the power RF waves that converge to form the controlled constructive interference at the location of the receiver.

8. The method for wireless power transmission in a television system of claim 1, wherein the transmitter includes a power source connected to a microcontroller for controlling a radio frequency integrated chip for driving the at least two antennas of the transmitter for transmitting the RF power waves and for adjusting the at least two antennas of the transmitter to form the power RF waves that converge to form the controlled constructive interference at the location of the receiver.

9. The method for wireless power transmission in a television system of claim 1, wherein the receiver includes circuitry configured to provide a constant DC voltage output in the range of approximately 5 to 10 volts.

10. A wireless power transmission system for a television system, comprising:

a transmitter integrated into the television system including at least two antennas configured to transmit a plurality of power RF waves that converge to form controlled constructive interference; and a communication component of the transmitter configured to receive communications via a communications signal indicative of a location of a receiver relative to the transmitter, wherein a first set of antennas of the at least two antennas of the transmitter are configured to transmit the plurality of power RF waves that converge to form the controlled constructive interference at the location of the receiver, wherein the receiver is connected to an electronic device and captures RF energy from the controlled constructive interference for charging the electronic device, and wherein a second set of antennas of the at least two antennas of the transmitter are further capable of transmitting another plurality of power RF waves that converge to form controlled destructive interference, the second set of antennas being distinct from the first set of antennas.

11. The wireless power transmission system for a television system of claim 10, wherein the transmitter is an individual component or an integrated layer of the television system.

12. The wireless power transmission system for a television system of claim 10, wherein the television system includes a front transparent screen layer, a polarized film layer, an LED or LCD backlight layer, and wherein the transmitter is included in a separate layer attached to one of the other layers in the television system.

13. The wireless power transmission system for a television system of claim 10, wherein the transmitter further comprises communication circuitry of the communication component configured to send short RF signals between the transmitter and the receiver to establish a path or channel for the power RF waves to converge in 3d space to form the controlled constructive interference.

14. The wireless power transmission system for a television system of claim 10, further comprising communication circuitry of the communication component for sending RF signals between the transmitter and the receiver, wherein the RF signals are transmitted using wireless communication protocols selected from the group consisting of Bluetooth, Wi-Fi, Zigbee, or FM radio.

15. An apparatus for wireless power transmission in a television system, comprising:

a transmitter located within the television system for generating power RF waves that converge to form controlled constructive interference, wherein the transmitter includes at least two RF antennas and a communication component configured to receive communications via a communications signal indicative of a location of a receiver relative to the transmitter;

the transmitter is configured to transmit, via a first set of antennas of the at least two RF antennas, the power RF waves that converge to form the controlled constructive interference at the location of the receiver, wherein:

the receiver is connected to an electronic device, and the receiver is configured to capture RF energy from the controlled constructive interference to establish an operating DC voltage for the electronic device, and a rectifier coupled to the receiver is configured to rectify AC voltage received from the at least two RF antennas into the operating DC voltage; and the transmitter is further configured to transmit, via a second set of antennas of the at least two RF antennas, additional power RF waves that converge to form controlled destructive interference, the second set of antennas being distinct from the first set of antennas.

16. The apparatus for wireless power transmission in a television system of claim 15, further comprising communication circuitry in the receiver and the transmitter wherein the communication circuitry utilizes a communication protocol selected from the group consisting of: Bluetooth, infrared, Wi-Fi, FM radio, and Zigbee for transmitting communication signals between the receiver and the transmitter.

17. The apparatus for wireless power transmission in a television system of claim 15, wherein the at least two RF antennas of the transmitter comprise antenna elements mounted around edges of the television, antenna elements mounted on the back of the television, or antenna elements on printed micro-antennas built-in the television system.

18. The apparatus for wireless power transmission in a television system of claim 17, wherein the at least two antenna elements of the transmitter and antenna elements of the receiver operate in a frequency range of about 900 MHz to about 5.8 GHz.

19. The apparatus for wireless power transmission in a television system of claim 17, wherein the at least two antenna elements of the transmitter and antenna elements of the receiver operate in similar band frequencies that allow a multi-channel operation of transmitting power RF waves that converge to form the controlled constructive interference to power one or more electronic devices.

20. The apparatus for wireless power transmission in a television system of claim 17, wherein the at least two antenna elements of the transmitter include antenna elements with polarization of vertical pole, horizontal polarization, circular polarization, left hand polarization, right hand polarization, or a combination of polarizations.

* * * * *